(12) United States Patent
Shteinfeld et al.

(10) Patent No.: US 10,262,222 B2
(45) Date of Patent: Apr. 16, 2019

(54) METHOD AND SYSTEM FOR MEASURING DIMENSIONS OF A TARGET OBJECT

(71) Applicant: SICK Inc., Minneapolis, MN (US)

(72) Inventors: Alexander Shteinfeld, Newton, MA (US); Richard Lydon, Hanover, MA (US); George Liu, Dover, MA (US); Udrekh Gavale, Natick, MA (US)

(73) Assignee: SICK INC., Minneapolis, MN (US)

( * ) Notice: Subject to any disclaimer, the term of this patent is extended or adjusted under 35 U.S.C. 154(b) by 335 days.

(21) Appl. No.: 15/097,511

(22) Filed: Apr. 13, 2016

(65) Prior Publication Data

US 2017/0302905 A1    Oct. 19, 2017

(51) Int. Cl.
   *G06K 9/22*       (2006.01)
   *H04N 13/204*    (2018.01)
   *G06T 7/62*       (2017.01)

(52) U.S. Cl.
   CPC .............. *G06K 9/228* (2013.01); *G06T 7/62* (2017.01); *H04N 13/204* (2018.05); *G06T 2207/10028* (2013.01)

(58) Field of Classification Search
   CPC .......... G06T 7/602; G06T 2207/10028; H04N 13/20; H04N 13/0203
   See application file for complete search history.

(56) References Cited

U.S. PATENT DOCUMENTS

| | | | |
|---|---|---|---|
| 7,680,323 B1* | 3/2010 | Nichani | G06T 7/33 345/419 |
| 8,542,252 B2 | 9/2013 | Perez et al. | |
| 2010/0208035 A1 | 8/2010 | Pinault et al. | |
| 2010/0315412 A1* | 12/2010 | Sinha | G06T 15/00 345/419 |
| 2013/0182114 A1* | 7/2013 | Zhang | H04N 7/18 348/150 |
| 2013/0218472 A1* | 8/2013 | Fu | G06K 9/00637 702/5 |

(Continued)

FOREIGN PATENT DOCUMENTS

| | | |
|---|---|---|
| JP | 2003242508 A | 8/2003 |
| JP | 2006109172 A | 4/2006 |

(Continued)

OTHER PUBLICATIONS

European search report dated Jul. 13, 2017, for corresponding European application 17162510.6, printed in English.

(Continued)

*Primary Examiner* — Peter Bradford
(74) *Attorney, Agent, or Firm* — Nath, Goldberg & Meyer; Jerald L. Meyer (57) ABSTRACT

The invention relates to a method for measuring dimensions of a target object. The method comprises
   acquiring depth data representative of the physical space, the depth data comprising data of the target object,
   converting the depth data into a point cloud,
   extracting at least one plane from the point cloud,
   identifying a ground plane,
   eliminating the ground plane from the point cloud,
   extracting at least one point cluster from the remaining point cloud,
   identifying a point cluster of the target object,
   estimating dimensions of the target object based on the point cluster of the target object.

17 Claims, 4 Drawing Sheets

(56) References Cited

U.S. PATENT DOCUMENTS

| | | |
|---|---|---|
| 2014/0192050 A1 | 7/2014 | Qiu |
| 2014/0368639 A1* | 12/2014 | Wu ........................ G01B 11/00 |
| | | 348/136 |
| 2016/0163067 A1* | 6/2016 | Williams ............... G01B 11/00 |
| | | 382/154 |
| 2017/0083864 A1* | 3/2017 | Saito ................ G06Q 10/08345 |
| 2017/0140550 A1* | 5/2017 | Zhang ........................ G06T 7/50 |
| 2017/0142405 A1* | 5/2017 | Shors ..................... G01C 11/04 |
| 2017/0191826 A1* | 7/2017 | Nagori .................... B60R 11/04 |

FOREIGN PATENT DOCUMENTS

| | | |
|---|---|---|
| JP | 2012083157 A | 4/2012 |
| JP | 2012137304 A | 7/2012 |
| JP | 2013196355 A | 9/2013 |
| JP | 2015125685 A | 7/2015 |
| WO | 2013123404 A1 | 8/2013 |
| WO | 2016/089483 A1 | 6/2016 |

OTHER PUBLICATIONS

Japanese office action dated May 8, 2018 for corresponding JP application.

Choi, Sunglok, et al., "Robust Ground Plane Detection from 3D Point Clouds", 2014 14th International Conference on Control, Automation and Systems (ICCAS 2014), Oct. 22-25, 2014 in KINTEX, Gyeonggi-do, Korea.

European Communication dated Jan. 3, 2019, from counterpart application.

* cited by examiner

METHOD AND SYSTEM FOR MEASURING DIMENSIONS OF A TARGET OBJECT

The present invention relates to a method and a system for measuring dimensions of a target object.

The measuring of the spatial dimensions of a target object is required in a plurality of industrial applications. One exemplary application is the measurement of the dimensions of goods loaded on a pallet. For the measurement of such pallet loads e.g. stationary scanners can be used. The measured dimensions of the pallet load can then be used to obtain a weight of the pallet, e.g. based on a specific weight of the loaded goods. Additionally, it can be established, if the pallet is loaded completely.

Currently, the used scanners are limited to the recognition of cuboidal objects and can often not be used flexibly due to their stationary position.

It therefore is the object of the present invention to provide a method and a system for measuring the dimensions of an object that can be flexibly used and allow the measurement of objects having different shapes.

In the present invention, a method and a system are provided which allow the measurement of the dimensions of a target object.

According to claim 1, the method of the invention comprises:
 acquiring depth data representative of the physical space, the depth data comprising data of the target object,
 converting the depth data into a point cloud,
 extracting at least one plane from the point cloud,
 identifying a ground plane,
 eliminating the ground plane from the point cloud,
 extracting at least one point cluster from the remaining point cloud,
 identifying a point cluster of the target object,
 estimating dimensions of the target object based on the point cluster of the target object.

Initially, depth data comprising data of the target object is acquired. The depth data can be acquired using a 3D-vision device, e.g. a 3D-camera system, a stereo camera, a time-of-flight camera or a laser scanner, which is e.g. based on triangulation. The 3D-vision device can scan a scene containing the target object. Particularly, a handheld 3D-vision device is used.

Advantageously, a 3D-camera system comprising a camera and a structured illumination device is used to acquire the depth data. The structured illumination device can be arranged distantly to the camera of the 3D-camera system. The depth data can be acquired in a video sequence, wherein information of the video sequence with a duration of e.g. a few seconds can be combined.

The depth data is then converted into a point cloud, wherein the points of the point cloud can be stitched together. The stitching leads to a connection of the points of the point cloud although the points of the point cloud may have been acquired at different times (e.g. at different times of the video sequence) or under different directions of view.

Particularly, the depth data together with the spatial information about the depth data can be used to create the point cloud. The point cloud can represent the target object and further objects in a three-dimensional space. The point cloud can also comprise points of further objects which are not the target object. Each point in the point cloud can comprise a value in an x-direction, a value in a y-direction and a value in a z-direction. The x-, y- and z-direction can each be perpendicular to both other directions. Alternatively, the points of the point clouds can have spatial coordinates in the form of polar coordinates.

From the point cloud, at least one plane is extracted. That is, a flat surface from the point cloud is identified, wherein the flat surface is defined as a plane of the point cloud. Preferably, all planes are extracted from the point cloud. In other words, all planes that can be identified are extracted from the point cloud.

From the at least one plane or from the plurality of extracted planes a ground plane is identified. If only one plane is extracted, this one plane is identified as the ground plane. The ground plane represents the points of the point cloud, which originate from a ground or floor of the scanned scene. The ground plane can be identified among all identified planes, e.g. due to its spatial orientation and/or due to its size. After the ground plane has been identified the ground plane is removed from the point cloud in order to reduce the number of points in the point cloud. When removing the ground plane from the point cloud, all points representing the ground plane are eliminated in the point cloud. Thus, only objects comprised in the depth data remain in the point cloud thereby facilitating an easier identification of the target object requiring less computational effort and memory usage.

When the ground plane is eliminated, different objects in the point cloud may not be connected anymore. These unconnected objects can be separated into different objects. Thereby, a first discrimination between the target object and other objects can be achieved. In consequence, the identification of the target object is simplified and can be conducted in a computational efficient way.

In the remaining points of the point cloud, at least one point cluster is extracted. A point cluster can be an aggregation of a plurality of points, wherein the points comprise a predefined maximum spatial distance to the closest further point of the point cluster. In the point cloud a plurality of point clusters can be present and can be extracted or identified. Preferably, all point clusters (i.e. all point clusters that can be identified) are extracted.

In order to identify the point cluster of the target object, the point cluster of the target object can exemplarily be identified as the point cluster that is closest to the e.g. 3D-camera system. This is based on the assumption that a person using the 3D-vision device will point the 3D-vision device onto the target object. Alternatively, the point cluster having the most points can be identified as the point cluster of the target object. If only one point cluster is extracted, this one point cluster is identified as the point cluster of the target object.

When the point cluster of the target object has been identified, the dimensions of the target object can be estimated based on the point cluster of the target object.

From the dimensions of the target object, e.g. a volume of the target object and/or a weight can be calculated. As an example, an outer surface of the point cluster can be calculated, wherein the volume of the target object is estimated as the volume inside the outer surface. If the point cluster does not comprise a closed outer surface of the target object (for example, the backside of the target object cannot be visible to the 3D-vision device), the outer surface can be extrapolated or estimated in order to achieve a closed outer surface.

According to an embodiment, the method further comprises removing a background from the point cloud, before the ground plane is identified. As background points of the point cloud are removed, the number of points in the point cloud can be reduced, leading to a faster and more efficient processing of the remaining points. This also allows an easier identification of the ground plane. As an example, the background can be defined as all points which have a distance from the 3D-vision device that is greater than a predefined threshold value.

According to a further embodiment a point of the point cloud is defined as background, if its value in at least one dimension is greater than a predetermined threshold. Particularly, a threshold value for the x-direction, for the y-direction and/or for the z-direction can be established. If a point of the point cloud has a value above at least one of these threshold values, the point of the point cloud is classified as background.

To be more specific, if coordinates in x-, y- and z-direction are used, a point can be defined as background, if one or more of the following conditions are fulfilled:

$X > MIN(X) + T$, $Y > MIN(Y) + T$ and/or $Z > MIN(Z) + T$, wherein T is a configurable parameter, X, Y, Z are values of a point of the point cloud in x-, y-, z-direction, respectively, and MIN(X)/MIN(Y)/MIN(Z) is the minimum value of any point of the point cloud in the x-/y-/z-direction, respectively. The minimum value (MIN(X), MIN(Y), MIN(Z)) can be different for each direction.

An origin of the x-, y-, z-coordinate system may be the 3D-vision device. This advantageously allows an easier execution of the method of the invention since—particularly when using a handheld 3D-vision device—the coordinate system can be defined before the beginning of the method. Thus, the coordinate system is not required to be altered during execution of the method.

In a further embodiment, identifying the ground plane comprises repeatedly identifying a plane in the point cloud, storing the identified plane and temporarily removing the identified plane from the point cloud. After all planes have been identified, stored and removed from the point cloud, the ground plane can be finally identified among all stored and identified planes. In other words, the respective identified plane is only temporarily removed from the point cloud until all planes of the point cloud are identified. That is, removing the identified plane from the point cloud allows a simplified and therefore more efficient identification of further planes in the point cloud. Removing the identified plane from the point cloud can also prevent that one plane is identified multiple times.

Additionally, as more and more planes are identified, stored and removed from the point cloud, the remaining number of points in the point cloud decreases. This allows an increasingly faster processing when identifying consecutive planes in the point cloud.

The identified planes can be stored in normal vector form or in the form $ax+by+cz+d=0$, wherein a, b, c and d are coefficients and x, y, z are variables in the x-, y- and z-direction. For example, the ground plane can be identified as the plane that has a normal vector which is substantially parallel to the z-direction.

Usually, it is expected to detect 4 to 5 planes in a point cloud. Consequently, the step of identifying a plane in the point cloud, storing the identified plane and removing the identified plane from the point cloud have to be conducted 4 to 5 times. The steps of storing the identified plane and removing the identified plane from the point cloud are not repeated anymore, when no plane can be found in the remaining point cloud.

According to a further embodiment, a RANSAC algorithm is used to identify planes in the point cloud. A RANSAC (random sample consensus) algorithm is an iterative method to estimate parameters of a set of observed data. A RANSAC algorithm is particularly useful if the measurement data (i.e. the depth data) comprises outliers, i.e. points of the point cloud that are distant from other points, which is usually the case for the depth data and the point cloud.

In a further embodiment identifying the point cluster of the target object comprises identifying the closest point cluster as the point cluster of the target object. Hereby it is assumed that the closest point cluster is most likely the target object, as—when using e.g. a handheld 3D-vision device—the 3D-vision device will be pointed at the target object. The closest point cluster can be identified such that one point of the point cluster has a minimum value for $x^2+y^2+z^2$ if coordinates in x-, y- and z-direction are used.

In a further embodiment a centroid point is calculated for each point cluster, wherein a distance (e.g. to the 3D-vision device) of each point cluster is calculated based on the corresponding centroid point. The centroid point can represent a geometric center of the point cluster or the center of gravity of the point cluster.

In a further embodiment, the point clusters are identified using a predefined minimum distance between point clusters and/or a predefined minimum cluster size. The predefined minimum distance and/or the predefined minimum cluster size can be configurable parameters.

A point cluster can be an aggregation of points of the point cloud, wherein each point of the point cluster has a maximum distance to another point of the point cluster which is below the predefined minimum distance between the point clusters. That is, two points of different point clusters will have at least a distance which is equal to or greater than the predefined minimum distance between the point clusters.

In addition, a point cluster can have a predefined minimum number of points, i.e. the predefined minimum cluster size.

If an aggregation of points does not reach the minimum number of points, the aggregation of points is preferably not identified as a point cluster. The points of such an aggregation of points can be ignored in further steps of the method.

In a further embodiment a coordinate system having an x-, a y- and a z-direction is used, wherein each of the x-, y- and z-direction is preferably perpendicular to both other directions and wherein the point cluster of the target object is rotated such that the ground plane would become parallel to a z=0 plane. Specifically, the rotation can be performed using a rotation matrix, wherein a rotation with the rotation matrix would rotate the ground plane (if it was rotated using the rotation matrix) such that the ground plane would become parallel to the z=0 plane. As the ground plane can already be eliminated when the point cluster of the target object is rotated, only the point cluster of the target object can be rotated.

In the z=0 plane all points have a z-value of zero. The z=0 plane can be a plane that is aligned horizontally as viewed from the 3D-vision device. The rotation can be calculated using the rotation matrix which—in turn—can be calculated based on the position and orientation of the ground plane relative to the z=0 plane. Such a rotation of the point cluster facilitates an easier calculation of the dimensions of the target object.

In a further embodiment, a height of the target object is calculated after the point cluster of the target object is rotated. The height of the target object can be easily calculated as the maximum distance of two points of the point cluster of the target object in the z-direction.

In a further embodiment a minimum enclosing flat geometric shape is calculated for the point cluster of the target object. The flat geometric shape may be a triangle, a rectangle, a circle, a polygon, etc. Preferably, a rectangle is used, wherein the rectangle can be a bounding box for the points of the point cluster of the target object. Based on the dimensions of the geometric shape, the dimensions and/or the volume of the target object can be calculated or estimated. The use of different geometric shapes bears the advantage that dimensions of target objects with different forms can be calculated. Particularly, also non-cuboidal shapes or irregular shapes can be processed.

The size of the geometric shape can be calculated such that in an x- and y-direction the geometric shape comprises at least one point of the point cluster of the target object in each boundary line and the majority of points is located inside the boundary lines. Alternatively or additionally, outside each boundary line of the geometric shape at least one point of the point cluster of the target object can be present. The size of the geometric shape can be increased until one or both of the above conditions is/are still fulfilled.

As an example, based on the width and the length of a rectangle and the object height, the dimensions and/or volume of the target object can be calculated. Preferably the rectangle is calculated after the rotation of the point cluster of the target object. Further preferably, the rectangle is calculated such that it is parallel to the ground plane or the z=0 plane.

In accordance with a further embodiment the point cluster of the target object is projected onto the ground plane or the z=0 plane before the minimum enclosing flat geometric shape is calculated. The projection onto the ground plane or the z=0 plane allows an easier and faster calculation of the geometric shape, as all calculations for the geometric shape can be performed in a two-dimensional space instead of a three-dimensional space. Additionally, also dimensions of elevated target objects (e.g. pallet loads on a forklift) can be calculated in the same manner. Advantageously, a projection onto the z=0 plane is performed by setting the values of the points of the point cluster of the target object to a z-value of zero.

Preferably, the used geometric shape can be selected from a predefined number of geometric shapes, wherein the actually used shape is selected such that it encloses a maximum number of points without exceeding the projection onto the ground plane. The geometric shape can be selected such that it is enclosing the projection of the target object onto the ground plane with a minimal distance.

In a further embodiment, the depth data is acquired using a handheld 3D-vision device. The handheld 3D-vision device can be a 3D-camera system, particularly a 3D-camera system having a structured light illumination, a laser scanner, a time-of-flight camera (TOF-camera) or a stereo-camera. The usage of a handheld 3D-vision device allows a flexible measurement of different target objects as the 3D-vision device can be easily displaced or carried around.

In a further embodiment the depth data is transferred from the handheld 3D-vision device to a portable processing device. The processing of the depth data and the estimation of the dimensions of the target object can be executed in the processing device. In consequence, the 3D-vision device can have fewer components and comprise a smaller housing thus making it easier to use. The transfer between the handheld 3D-vision device and the processing device can be wireless, e.g. using wireless LAN (local area network), or can use a cable connection. The handheld 3D-vision device can be supplied with electrical energy using the cable connection. Alternatively, the processing device can be stationary.

The processing device may be a host server that can be connected to the handheld 3D-vision device via the Internet. Alternatively, the processing device may comprise an Internet connection which can be used for a communication of the processing device with a host server. The host server can partly or completely execute the calculation steps of the inventive method.

In a further embodiment, the target object is a pallet load. The method of the invention can therefore be used to verify if a pallet has been loaded completely. Also the method of the invention can be used with regular packages, i.e. items that are not situated on a pallet.

In a further embodiment a barcode or another machine-readable information is identified and evaluated, wherein the barcode or the other machine-readable information preferably contains information about the target object. The barcode or the machine-readable information can be attached to a surface of the target object and can contain e.g. information about the size of the target object (i.e. the pallet load). This information can be used to assess if a pallet load is complete. The barcode or the machine-readable information can be an optical machine-readable representation of data. The barcode or the machine-readable information can be used to identify the point cluster of the target object and/or the target object itself. For this purpose the spatial position of the barcode or the machine-readable information can be determined and correlated with the spatial positions of the extracted point clusters. This can facilitate an easier identification of the point cluster of the target object.

The barcode can be identified using the 3D-camera system, wherein the evaluation (i.e. reading the information of the barcode) can be performed by the processing device.

In a further embodiment an image can be captured, wherein the image shows the target object. The image can be captured with the camera of the 3D-camera system and can assist in identifying the different point clusters, e.g. by using color or grey value differences of different regions of the image.

The invention further comprises a system for measuring dimensions of a target object, the system comprising:
  a 3D-vision device for acquiring depth data representative of the physical space, the depth data comprising data of the target object, and
  a processing device for processing said depth data, wherein the processing device is configured to
  convert the depth data into a point cloud,
  extract at least one plane from the point cloud,
  identify a ground plane,
  eliminate the ground plane from the point cloud,
  extract at least one point cluster from the remaining point cloud,
  identify a point cluster of the target object,
  estimate dimensions of the target object based on the point cluster of the target object.

The description concerning the inventive method is applicable mutatis mutandis to the inventive system. This is particularly true in view of advantages and the described preferred embodiments.

In an embodiment of the inventive system the processing device can be arranged in a processing unit. The processing unit may be separate from the 3D-vision device. Alternatively, the 3D-vision device and the processing device may share one single housing.

The 3D-vision device can for example be a 3D-camera system, a stereo camera, a time-of-flight camera or a laser scanner, which is e.g. based on triangulation. Particularly, a handheld 3D-vision device is used.

Advantageously, the 3D-camera system comprises a camera and a structured illumination device to acquire the depth data. The structured illumination device can be arranged distantly to the camera of the 3D-camera system.

Figure 1:
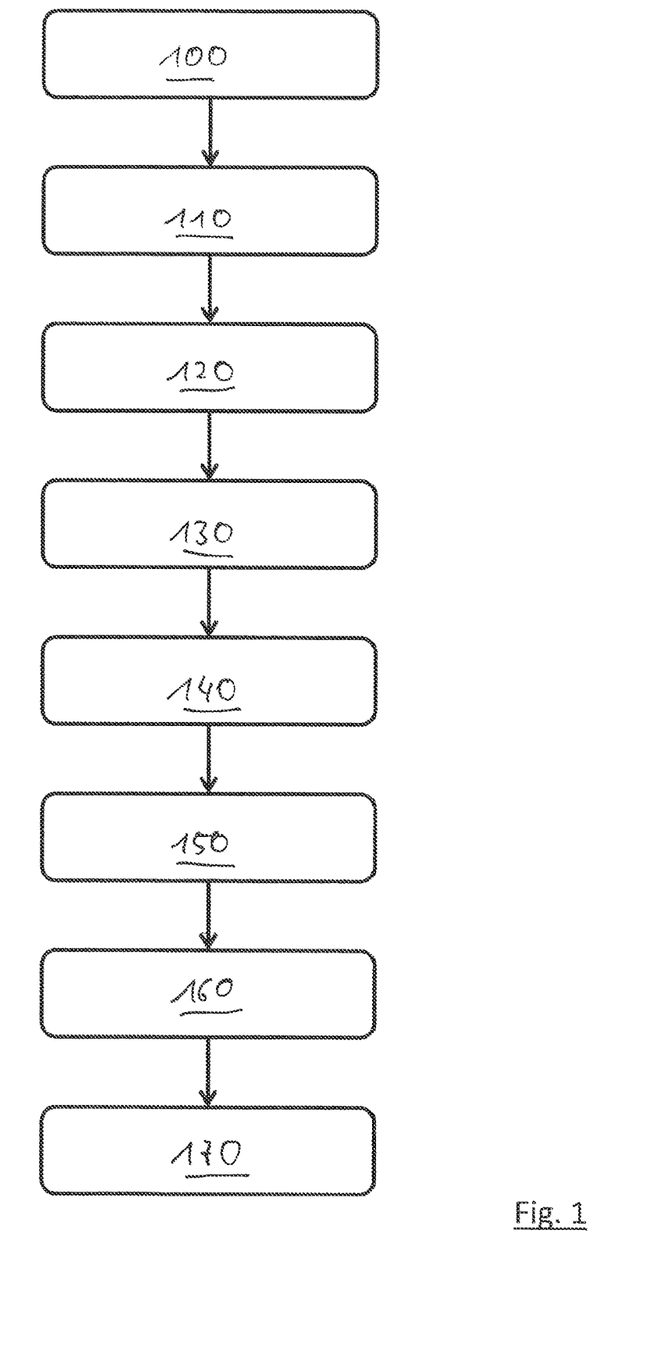
FIG. 1 depicts an example flow diagram for a method of measuring dimensions of a target object.

Various features and advantages of the present invention will become more apparent from the following description and accompanying drawing wherein:

Referring to the Figures, wherein like numerals indicate corresponding parts throughout the several figures and aspects of the invention, FIG. 1 shows a flow diagram of a method for measuring dimensions of a target object.

In step 100 a 3D-camera system performs a three-dimensional video-scanning of a scene including a target object thereby providing depth data, comprising the target object.

In step 110 the depth data is converted into a stitched point cloud.

Step 120 represents the removal of points from the point cloud, wherein the removed points correspond to the background. That is, step 120 represents a background filtering.

In step 130 a multi-plane segmentation takes place. In other words, at least one plane is extracted from the point cloud. Usually 4 to 5 planes can be extracted from the point cloud. The extracted planes are temporarily removed from the point cloud, wherein a ground plane is identified among the extracted planes.

In step 140 the ground plane is eliminated from all detected planes of the point cloud.

In step 150 point clusters are extracted from the remaining point cloud, wherein a point cluster of the target object is identified among the point clusters. The point cluster of the target object is then separated from the point cloud.

The point cluster of the target object is rotated in step 160 such that a plane of the point cluster of the target object that is parallel to the ground plane becomes parallel to a z=0 plane. Furthermore, a height of the target object is calculated.

In step 170 the point cluster of the target object is projected onto the z=0 plane. From the projected points an enclosing rectangle is calculated and the dimensions of the target object are estimated.

Figure 2:
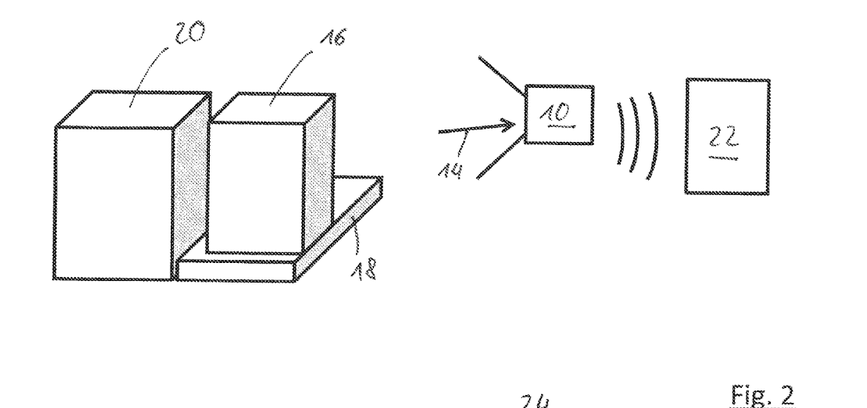
FIG. 2 shows an example embodiment of a system for measuring dimensions of a target object.

Turning now to FIG. 2, FIG. 2 shows an exemplary setup of a system for measuring dimensions of a target object. The system comprises a camera 10 that receives reflected light 14 of a structured illumination device (not shown). A structured illumination of the structured illumination device is projected onto a target object 16 that is placed on a pallet 18. A further object 20 is present next to the pallet 18, wherein the further object 20 is also illuminated by the structured illumination and scanned by the camera 10. The further object 20 could also be arranged on the pallet 18.

From the reflected light the camera 10 derives depth data including depth data from the target object 16 and the further object 20. The depth data is transmitted wirelessly to a processing unit 22.

Figure 3A:
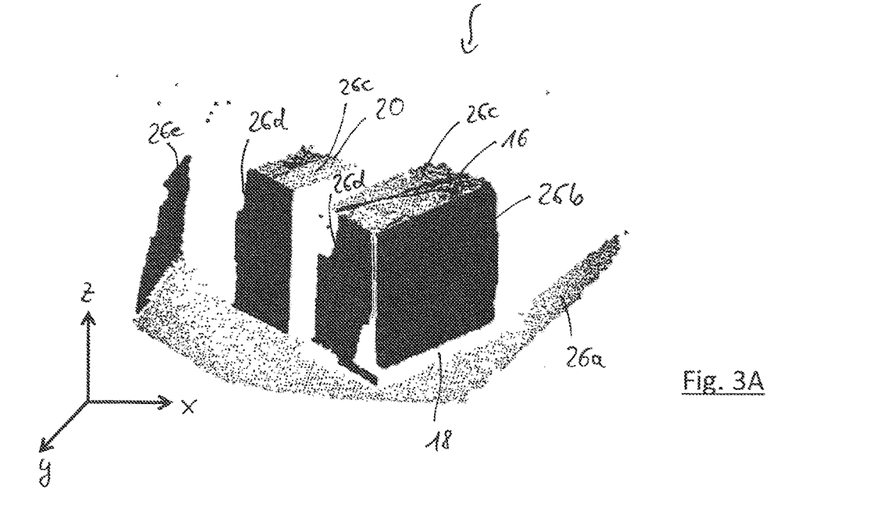
FIG. 3A shows an example of a point cloud calculated from depth data acquired by a system as shown in FIG. 2.

The processing unit 22 transforms the depth data into a stitched point cloud 24. An exemplary point cloud 24 corresponding to such depth data is shown in FIG. 3A.

In the point cloud 24 several planes are identified. In the example of FIG. 3A a first plane 26a, a second plane 26b, a third plane 26c, a fourth plane 26d and a fifth plane 26e are identified. The first plane 26a belongs to the ground floor, whereas the second plane 26b corresponds to a side surface of the target object 16. The third plane 26c covers a top surface of the target object 16 as well as a top surface of the further object 20. Correspondingly, the fourth plane 26d covers a front side of the target object 16 and a front side of the further object 20. The fifth plane 26e belongs neither to the target object 16, nor to the further object 20.

The processing unit 22 then identifies the plane 26a as the ground plane, based on the finding that the plane 26a spreads through the whole point cloud and has a normal vector in z-direction. The coordinate system in x-, y- and z-direction is shown in FIG. 3A.

Figure 3B:
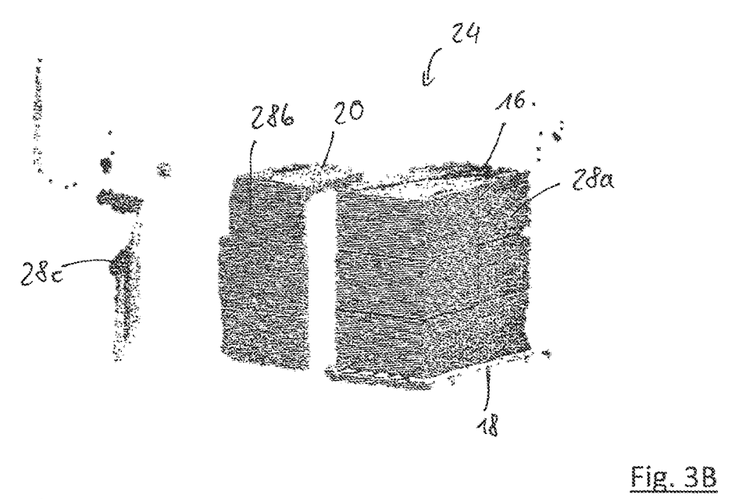
FIG. 3B shows the point cloud of FIG. 3A, wherein a ground plane has been removed.

The processing unit 22 then removes the ground plane 26a from the point cloud 24. The remaining point cloud 24 is shown in FIG. 3B. In the remaining point cloud 24 point clusters 28 are identified, wherein the point clusters 28 are identified using a predefined minimum distance between point clusters 28 and/or a predefined minimum cluster size.

Figure 3C:
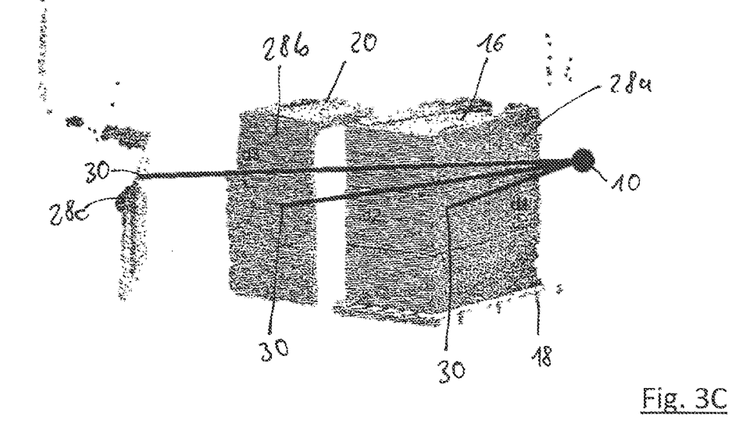
FIG. 3C shows the point cloud of FIG. 3B, wherein centroid points have been calculated.

As shown in FIGS. 3B and 3C a first point cluster 28a, a second point cluster 28b and a third point cluster 28c are identified. For each point cluster a centroid point 30 is calculated (FIG. 3C). The distances of the centroid points 30 to the camera 10 are shown. The point cluster 28a is closest to the camera 10 and is thus defined as the point cluster 28a of the target object.

Figure 3D:
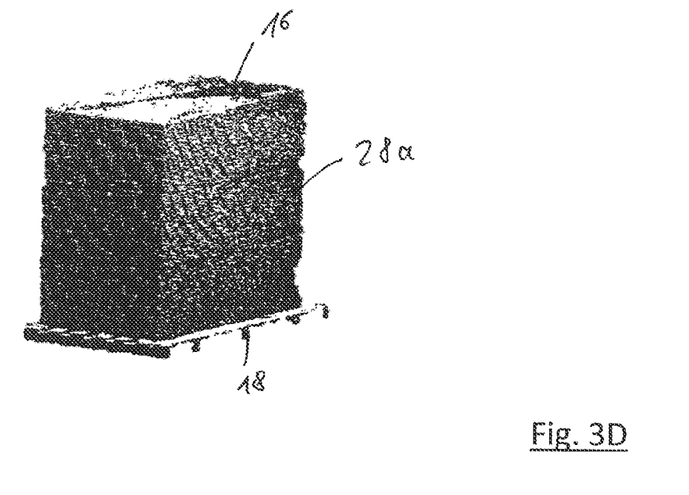
FIG. 3D shows a point cluster of a target object as isolated from FIG. 3C.

The point cluster 28a of the target object is then separated, as shown in FIG. 3D. The height of the point cluster 28a of the target object is calculated.

Figure 3E:
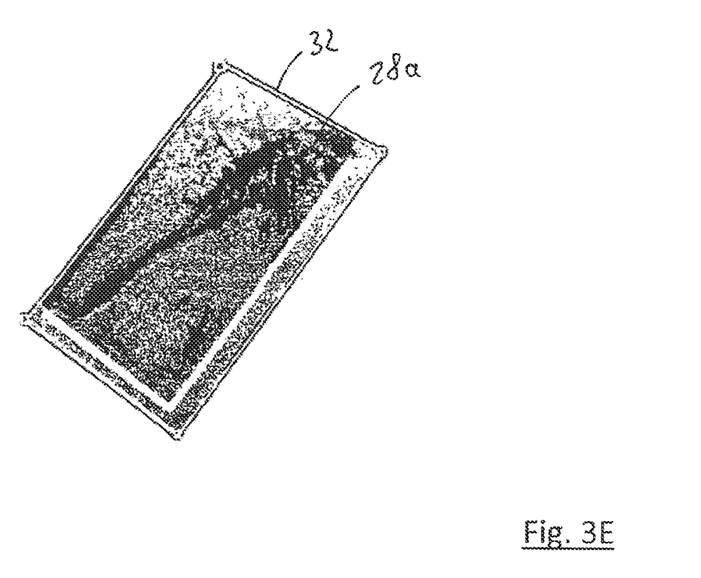
FIG. 3E shows a projection of the point cluster of the target object of FIG. 3D onto a z=0 plane.

The point cluster 28a of the target object is then projected onto the z=0 plane (i.e. a plane in which all points have a z-value of zero) as shown in FIG. 3E. Using the projected points of the point cluster 28a a rectangle 32 is selected from a number of geometric shapes, wherein the rectangle is calculated such that it encloses a maximum number of points of the projected point cluster 28a, without exceeding the projected point cluster 28a. Based on the size of the rectangle 32 and the height of point cluster 28a over the ground plane 26a the dimensions, i.e. the volume of the target object 16 is calculated.

The result of the measurement of the dimensions of the target object 16 can be shown on a screen of the processing unit 22.

While the present disclosure has been described in connection with specific implementations, explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware, software, or a combination of both.

REFERENCE NUMERALS 10 camera
14 reflected light 16 target object
18 pallet
20 further object
22 processing unit
24 point cloud
26a-26e planes
28a-28c point cluster
30 centroid point
32 rectangle
100 acquiring 3D depth data
110 convert depth data to point cloud
120 background filtering
130 multi plane segmentation
140 ground floor elimination
150 cluster extraction
160 rotation
170 enclosing rectangle calculation

The invention claimed is:

1. A method for measuring dimensions of a target object, comprising the steps of:
   acquiring depth data representative of a physical space, the depth data comprising data of a target object;
   converting the depth data into a point cloud;
   extracting at least one plane from the point cloud;
   identifying a ground plane by repeatedly identifying a plane in the point cloud, storing the identified plane and temporarily removing the identified plane from the point cloud, wherein the ground plane is identified among all said stored and identified planes after all said planes have been identified, stored and removed from the point cloud;
   eliminating the ground plane from the point cloud;
   extracting at least one point cluster from the remaining point cloud;
   identifying a point cluster of the target object; and
   estimating a volume of the target object based on the point cluster of the target object.

2. The method of claim 1, further comprising removing a background from the point cloud before the ground plane is identified.

3. The method of claim 2, wherein a point of the point cloud is defined as background if its value in at least one dimension is greater than a predetermined threshold.

4. The method of claim 1, wherein a RANSAC algorithm is used to identify the planes in the point cloud.

5. The method of claim 1, wherein identifying the point cluster of the target object comprises identifying the closest point cluster as the point cluster of the target object.

6. The method of claim 5, wherein for each point cluster a centroid point is calculated, wherein a distance of each point cluster is calculated based on the corresponding centroid point.

7. The method of claim 5, wherein the point clusters are identified using a predefined minimum distance between point clusters and/or a predefined minimum cluster size.

8. The method of claim 1, wherein a coordinate system having an x-direction, a y-direction, and a z-direction is used, wherein each of the x-direction, the y-direction and the z-direction is perpendicular to both other directions and wherein the point cluster of the target object is rotated such that the ground plane would become parallel to a z=0 plane.

9. The method of claim 8, wherein a height of the target object is calculated after the point cluster of the target object is rotated.

10. The method of claim 1, wherein a minimum enclosing flat geometric shape is calculated for the point cluster of the target object.

11. The method of claim 10, wherein the point cluster of the target object is projected onto the ground plane or onto a z=0 plane before the minimum enclosing flat geometric shape is calculated.

12. The method of claim 1, wherein the depth data is acquired using a handheld 3D-vision device.

13. The method of claim 12, wherein the depth data is transferred from the handheld 3D-vision device to a portable processing device.

14. The method of claim 1, wherein the target object is a pallet load.

15. The method of claim 1, wherein a barcode is identified and evaluated, wherein the barcode contains information about the target object.

16. A system for measuring dimensions of a target object, the system comprising:
   a 3D-vision device for acquiring depth data representative of a physical space, the depth data comprising data of a target object; and
   a processing device for processing said depth data, wherein the processing device is configured to:
   convert the depth data into a point cloud,
   extract at least one plane from the point cloud,
   identify a ground plane by repeatedly identifying a plane in the point cloud, storing the identified plane and temporarily removing the identified plane from the point cloud, wherein the ground plane is identified among all said stored and identified planes after all said planes have been identified, stored and removed from the point cloud,
   eliminate the ground plane from the point cloud,
   extract at least one point cluster from the remaining point cloud,
   identify a point cluster of the target object, and
   estimate dimensions of the target object based on the point cluster of the target object.

17. The system of claim 16, wherein the 3D-vision device is a handheld 3D-vision device and wherein the 3D-vision device and the processing device share one single housing.

* * * * *